(12) United States Patent
Sperry

(10) Patent No.: US 8,950,383 B2
(45) Date of Patent: Feb. 10, 2015

(54) GASEOUS FUEL MIXER FOR INTERNAL COMBUSTION ENGINE

(75) Inventor: Robert G. Sperry, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 0 days.

(21) Appl. No.: 13/595,915

(22) Filed: Aug. 27, 2012

(65) Prior Publication Data

US 2014/0053815 A1 Feb. 27, 2014

(51) Int. Cl.
*F02B 43/00* (2006.01)
*F02M 29/00* (2006.01)

(52) U.S. Cl.
USPC ............................. 123/527; 123/528; 48/189.4

(58) Field of Classification Search
USPC .................................................. 123/527, 528
See application file for complete search history.

(56) References Cited

U.S. PATENT DOCUMENTS

| | | | |
|---|---|---|---|
| 3,664,315 A * | 5/1972 | Kramer | 123/445 |
| 3,698,430 A | 10/1972 | Van Gasselt et al. | |
| 3,862,907 A | 1/1975 | Shimotsuma et al. | |
| 3,913,617 A | 10/1975 | van Laar et al. | |
| 3,979,069 A * | 9/1976 | Garofalo | 239/400 |
| 4,415,275 A | 11/1983 | Dietrich | |
| 4,699,630 A | 10/1987 | Lee et al. | |
| 5,259,755 A * | 11/1993 | Irwin et al. | 431/9 |
| 5,302,325 A | 4/1994 | Cheng | |
| 5,408,978 A * | 4/1995 | Davis | 123/527 |
| 5,551,407 A * | 9/1996 | Greenway | 123/527 |
| 5,611,203 A | 3/1997 | Henderson et al. | |
| 5,810,052 A | 9/1998 | Kozyuk | |
| 5,913,239 A | 6/1999 | Morris, Jr. et al. | |
| 6,098,897 A | 8/2000 | Lockwood | |
| 6,131,552 A | 10/2000 | Paielli et al. | |
| 6,425,382 B1 | 7/2002 | Marthaler et al. | |
| 7,100,459 B2 | 9/2006 | Gehner et al. | |
| 7,264,231 B2 | 9/2007 | Kojima | |
| 7,568,340 B2 | 8/2009 | Marsal et al. | |
| 8,113,000 B2 * | 2/2012 | Laster et al. | 60/737 |
| 2010/0103766 A1 | 4/2010 | Assandri et al. | |
| 2010/0281766 A1* | 11/2010 | Livshits | 44/458 |
| 2010/0282238 A1 | 11/2010 | He | |
| 2011/0094206 A1 | 4/2011 | Liu et al. | |
| 2011/0265772 A1 | 11/2011 | Teng et al. | |

FOREIGN PATENT DOCUMENTS

EP 1 051 524 B1 10/2001

* cited by examiner

*Primary Examiner* — Lindsay Low
*Assistant Examiner* — Syed O Hasan
(74) *Attorney, Agent, or Firm* — Faegre Baker Daniels LLP

(57) ABSTRACT

A gaseous fuel mixer for an internal combustion engine includes a frustoconical cone and an outlet element extending from the frustoconical cone at an interior portion of the frustoconical cone. The outlet element and the frustoconical cone are located within a mixer passage of an intake system. The mixer passage has an internal diameter. The outlet element includes a plurality of transverse openings that connect a fuel passage formed within the outlet element to the interior portion of the frustoconical cone. The height and diameter of the frustoconical cone and the internal diameter of the passage form specific ratios that provide for uniform mixing of intake air and gaseous fuel prior to the mixture flowing into an intake manifold of the engine.

27 Claims, 4 Drawing Sheets

GASEOUS FUEL MIXER FOR INTERNAL COMBUSTION ENGINE

TECHNICAL FIELD

This disclosure relates to a gaseous fuel mixer for an internal combustion engine, particularly for a gaseous fuel engine. The gaseous fuel may be natural gas.

BACKGROUND

Internal combustion engines have been adapted to use alternative fuels, such as gaseous fuels, including natural gas. One challenge with gaseous fuel engines is optimizing mixing of intake air and the gaseous fuel, particularly in a small package size. If mixing of intake gas and gaseous fuel could be improved, combustion of the gas would be improved, leading to increased fuel efficiency and decreased emissions.

SUMMARY

This disclosure provides an internal combustion engine comprising an intake circuit and a gaseous fuel system connected to the intake circuit. The intake circuit includes a mixer passage and a gaseous fuel mixer positioned within the mixer passage. The mixer passage has a mixer passage axis. The gaseous fuel mixer extends along the mixer passage axis. The gaseous fuel mixer includes a frustoconical cone and an outlet element. The frustoconical cone includes a first end, an open second end, an interior portion, and a height H. The open second end has a diameter D and the open second end is positioned downstream from the first end. The outlet element is positioned in the interior portion. The outlet element includes a fuel passage and a plurality of transverse openings connecting the fuel passage to the interior portion.

This disclosure also provides an internal combustion engine comprising an intake circuit and a gaseous fuel system connected to the intake circuit. The intake circuit includes a mixer passage and a gaseous fuel mixer positioned within the mixer passage. The mixer passage has a mixer passage axis. The gaseous fuel mixer extends along the mixer passage axis. The mixer passage has an internal diameter ID. The gaseous fuel mixer includes a frustoconical cone and an outlet element. The frustoconical cone includes a first end, an open second end having a diameter D and positioned downstream from the first end, an interior portion, a height H, and a cone axis coaxial with the mixer passage. The outlet element is positioned in the interior portion. The outlet element includes a fuel passage and a plurality of transverse openings connecting the fuel passage to the interior portion.

Advantages and features of the embodiments of this disclosure will become more apparent from the following detailed description of exemplary embodiments when viewed in conjunction with the accompanying drawings.

DETAILED DESCRIPTION

Figure 1:
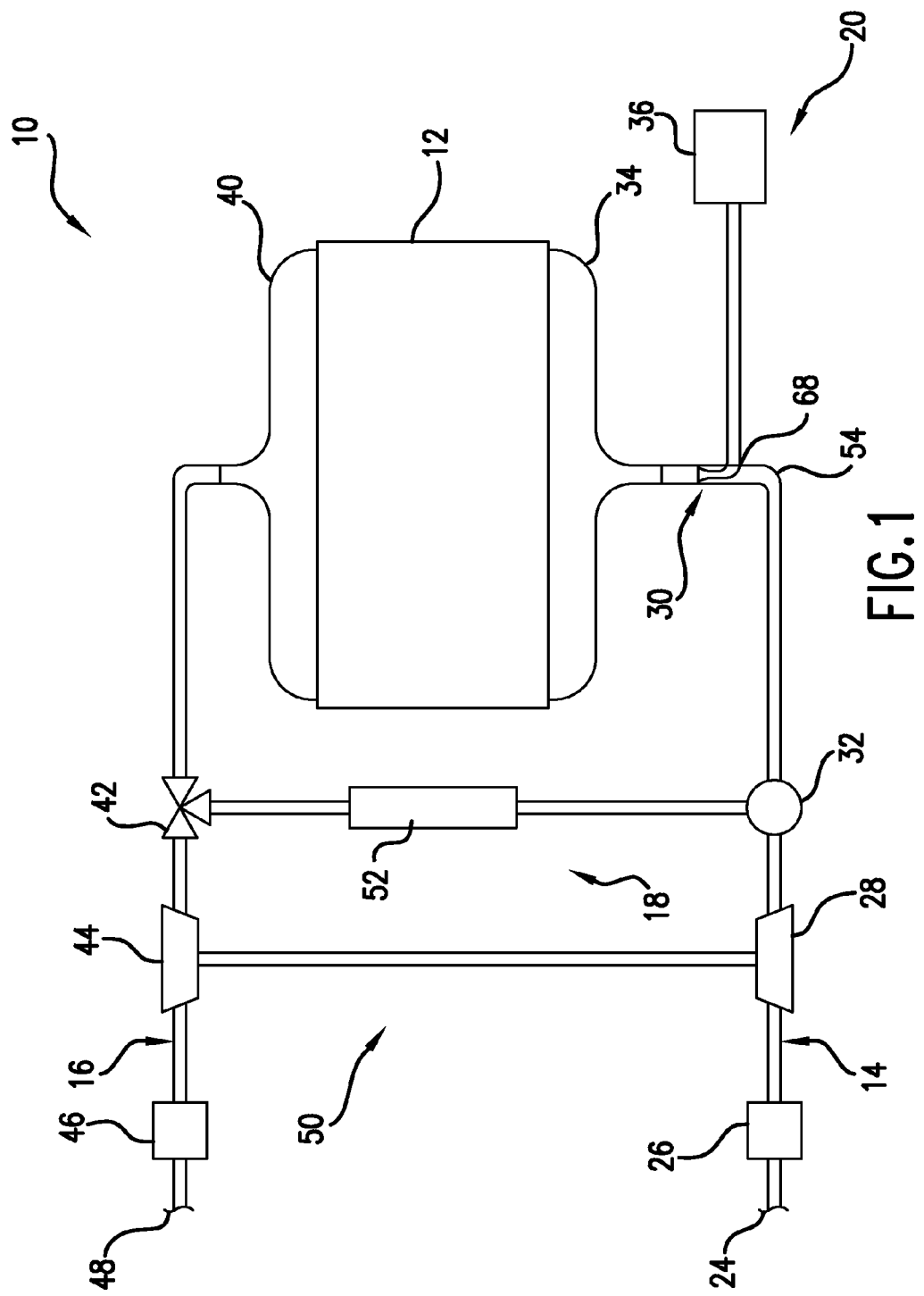
FIG. 1 is a schematic of an internal combustion engine including an exemplary embodiment of the present disclosure.

Referring to FIG. 1, a portion of an internal combustion engine is shown as a simplified schematic and generally indicated at 10. Engine 10 includes an engine body 12, an intake circuit 14, an exhaust circuit 16, an optional exhaust gas recirculation (EGR) system 18, and a gaseous fuel system 20. Engine 10 includes a gaseous fuel mixer that provides for efficient mixing in a relatively small package size because of the size and configuration of the mixer. The ability to achieve optimal mixing of a gaseous fuel in a small package size enables using the gaseous fuel mixer described hereinbelow in a variety of engine applications and configurations.

Intake circuit 14 connects to engine body 12 and includes an inlet portion 24, a filtration portion 26, a compressor 28, a gaseous fuel mixer 30, and an intake manifold 34. Inlet portion 24 permits external air to enter intake circuit 14, thus becoming intake air. Compressor 28 is positioned along intake circuit 14 downstream from inlet portion 24 and functions to pressurize the intake air for delivery to intake manifold 34. Filtration portion 26 is positioned along intake circuit 14 between inlet portion 24 and compressor 28, upstream from compressor 28. An EGR mixer 32 may be positioned along intake circuit 14 between compressor 28 and intake manifold 34, and functions to provide a mixture of EGR gas and intake air to intake manifold 34. Intake manifold 34 connects to engine body 12. Gaseous fuel mixer 30 is positioned along intake circuit 14 between EGR mixer 32 and intake manifold 34.

Gaseous fuel system 20 provides a source of gaseous fuel, such as natural gas, to gaseous fuel mixer 30 of intake system 14 and includes a gaseous fuel storage system 36. Gaseous fuel system 20 may include other elements, such as pressure regulators and valves (not shown), to regulate the flow of gaseous fuel to intake system 14.

Exhaust circuit 16 connects to engine body 12 and includes an exhaust manifold 40, a turbine 44, an aftertreatment system 46, and an atmospheric vent 48. Exhaust manifold 40 connects to engine body 12. Turbine 44 is positioned along exhaust circuit 16 downstream from exhaust manifold 40. Aftertreatment system 46 is positioned along exhaust circuit 16 between turbine 44 and atmospheric vent 48, downstream from turbine 44 and upstream from vent 48.

High-pressure exhaust gas from one or more combustion chambers (not shown) located in engine body 12 is guided into exhaust circuit 16 by exhaust manifold 40. The high-pressure exhaust gas drives turbine 44 of a turbocharger 50, which further drives compressor 28. The exhaust gas flows downstream from turbine 44 to aftertreatment system 46, which may include one or more filters, one or more catalysts, and/or one or more selective catalytic reduction devices. The aftertreatment system operates to remove particulates and certain emissions from the exhaust gas, e.g., NOx.

EGR system 18 may extend from exhaust circuit 16 to intake circuit 14. EGR system 18 includes an EGR valve 42, EGR mixer 32, and an EGR cooler 52. EGR valve 42 is positioned along exhaust circuit 16 downstream from exhaust manifold 40. EGR valve 42 is operable to permit exhaust gas to flow into EGR system 18. EGR cooler 52 is positioned along EGR system 18 downstream from EGR valve 42 and is operable to remove heat from the EGR exhaust gas before the EGR exhaust gas enters EGR mixer 32, where the EGR gas mixes with intake air before flowing downstream to intake manifold 34.

Figure 2:
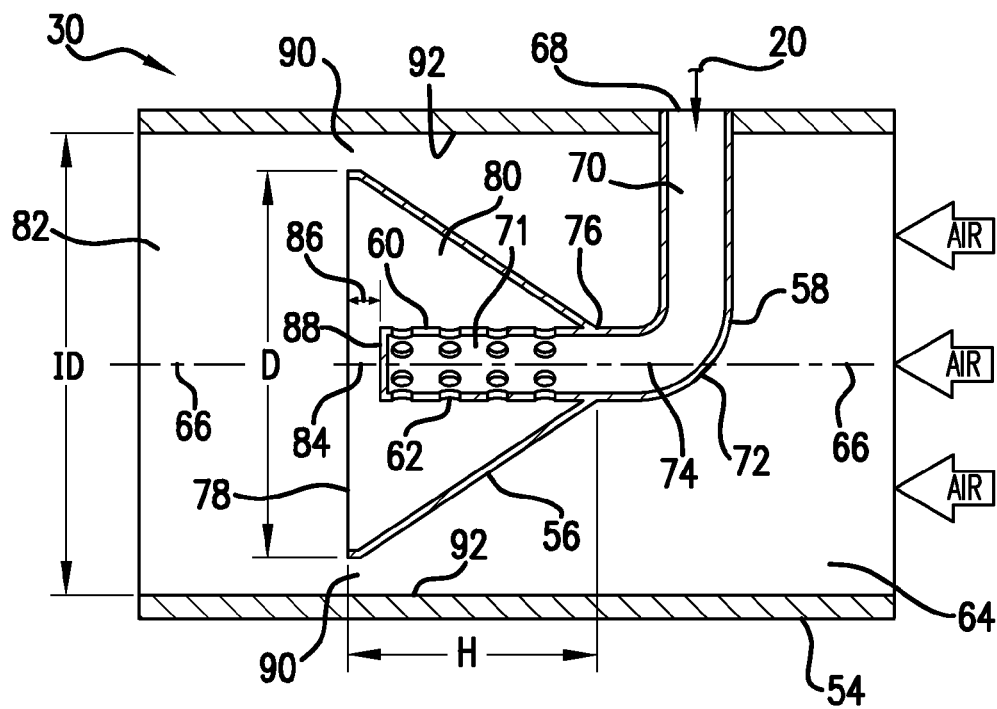
FIG. 2 is a gaseous fuel mixer of the internal combustion engine of FIG. 1 in accordance with a first exemplary embodiment of the present disclosure.

Referring now to FIG. 2, gaseous fuel mixer 30 in accordance with a first exemplary embodiment of the present disclosure is shown. Gaseous fuel mixer 30 includes an outer portion 54 forming a mixer passage 64. Outer portion 54 includes an outer portion axis 66. A frustoconical cone portion 56 is positioned within mixer passage 64. Cone portion 56 includes a first end 76 having a first diameter, a second end 78 having a second, larger diameter D and a cone axis 84. As will be described hereinbelow, second end 78 is positioned downstream from first end 76 with respect to the flow of intake air through mixer passage 64. Cone portion 56 also includes an interior portion 80.

Gaseous mixer 30 also includes an outlet element 60 that extends from first end 76 into interior portion 80. A closed distal end 88 of outlet element 60 terminates a longitudinal distance 86 from open second end 78 of cone portion 56. Longitudinal distance 86 is not critical and may be near zero in some embodiments, such as those shown in FIGS. 5-7. Thus, distal end 88 is offset longitudinal distance 86 from open end 78 of cone portion 56 toward first end 76 of cone portion 56. Outlet element 60 includes a fuel passage 71 having an element axis 74. Element axis 74 may also be parallel to cone axis 84 or may be coaxial with cone axis 84. Element axis 74 may be parallel to outer portion axis 66 or may be coaxial with outer portion axis 66. Similarly, cone axis 84 may be parallel or coaxial with outer portion axis 66. In the exemplary embodiment, cone portion 56 is centered in mixer passage 64, thus cone axis 84 is coaxial with outer portion axis 66, and element axis 74 and outer portion axis 66 are coaxial. The position of cone portion 56 in mixer passage 64 causes a radial gap 90 between second end 78 of cone portion 56 and an interior wall 92 of outer portion 54 about the periphery of second end 78. In the exemplary embodiment, outer portion gap 90 is preferably in the shape of an annulus and is therefore an annular gap.

Outlet element 60 includes a plurality of openings 62. Openings 62 are positioned radially about outlet element 60 at angularly spaced distances apart. Openings 62 may be angularly spaced about the periphery of outlet element 60 at approximately equal angles. In the exemplary embodiment, openings 62 are spaced about 60 degrees apart about the periphery of outlet element 60. Openings 62 serve to connect fuel passage 71 to interior portion 80 in a direction that is transverse to element axis 74, and transverse to outer portion axis 66. Openings 62 may be arrayed in rows. For example, in an exemplary embodiment there may be four rows of six openings. The rows may be spaced apart uniformly along the longitudinal or axial length of outlet element 60.

Outlet element 60 may be attached to cone portion 56 at first end 76 or outlet element 60 and cone portion 56 may be formed as one piece. The attachment of outlet element 60 to cone portion 56 may be through fasteners or a bonding process such as welding. Outlet element 60 and cone portion 56 may be formed as a single piece by stamping, casting, or through other suitable processes. Regardless of the method of attachment or formation, outlet element 60 is contiguous with cone portion 56 so that intake air is unable to flow into connection element 58 or through cone portion 56 from the upstream direction of intake system 14.

Outlet element 60 receives natural gas from natural gas system 20 by way of a connection element 58. Connection element 58 extends transversely to outer portion axis 66 from a port 68 formed in outer portion 54 to a bend portion 72. Connection element 58 then extends from bend portion 72 to connect to first end 76 of cone portion 56. Connection element 58 may extend perpendicularly to outer portion axis 66 in the distance from port 68 to bend portion 72. Connection element 58 may extend in parallel to outer portion axis 66 over the distance from bend portion 72 to first end 76 of cone portion 56, or may be coaxial with outer portion axis 66. In the exemplary embodiment, bend portion 72 is a 90-degree bend or turn. A fuel passage 70 is located within connection element 58. Fuel passage 70 receives gaseous fuel from port 68 and transports the gaseous fuel to fuel passage 71 formed in outlet element 60.

Cone portion 56 may be supported in outer portion 54 in several ways. In the exemplary embodiment, connection element 58 has sufficient strength and rigidity to support cone portion 56 in outer portion 54 under all operating conditions.

Cone portion 56 has a longitudinal length or height H and, as described hereinabove, a diameter D. Outer portion 54 has an internal diameter ID. A mathematical relationship in the form of a ratio exists between internal diameter ID and cone diameter D. An acceptable ratio is provided in equation 1. A preferred ratio is provided in equation 2.

$$1.07 \leq ID/D \leq 1.45 \quad \text{(Equation 1)}$$

$$1.23 \leq ID/D \leq 1.33 \quad \text{(Equation 2)}$$

A mathematical relationship in the form of a ratio also exists between the cone height H and cone diameter D. An acceptable ratio is provided in equation 3. A preferred ratio is provided in equation 4.

$$1.00 \leq D/H \leq 1.67 \quad \text{(Equation 4)}$$

$$1.29 \leq D/H \leq 1.39 \quad \text{(Equation 5)}$$

In addition to these ratios, it is preferable that outer portion 54 have a constant unobstructed internal diameter for at least 300 millimeters downstream from second end 78 of cone portion 56 and more preferably for at least 500 millimeters downstream from second end 78 of cone portion 56. This unobstructed distance is to form a mixing region 82 to create a proper mixing or entrainment zone for forced recirculation of the gaseous fuel with intake air, described in more detail hereinbelow. These dimensions and the relationships between the dimensions provides for an optimum balance between pressure drop of intake air across cone portion 56 and forced recirculation mixing of gaseous fuel and intake air to entrain the gaseous fuel in the intake air. As the intake air pressure drop across cone portion 56 increases or decreases from the optimal ratios, the mixing of gaseous fuel and intake air in mixing region 82 is less optimized.

Though gaseous mixer 30 is shown in FIG. 1 as being positioned in a region adjacent to intake manifold 34, gaseous mixer 30 may be positioned at any location in intake system 14 that provides the mixing zone described hereinabove. Gaseous mixer 30 may be placed upstream from compressor 28. However, it is preferable to place gaseous mixer 30 closer to intake manifold 34 to prevent an intake manifold overpressure (IMOP) event that may occur if the mixture of intake air and gaseous fuel ignites in intake manifold 34 or elsewhere in intake system 14.

The diameter of connection element 58, the diameter of outlet element 60, and the number and size of openings 62 is determined by the gaseous fuel feed rate from gaseous fuel system 20 to engine body 12. The principal limitation is the pressure drop through gaseous fuel mixer 30 and the need to limit backpressure, which would lead to high velocity turbulent flow throw gaseous mixer 30. The high velocity flow may bias gaseous fuel flow on one side of gaseous fuel mixer 30, leading to undesirable asymmetric mixing of gaseous fuel with intake air.

Figure 3:
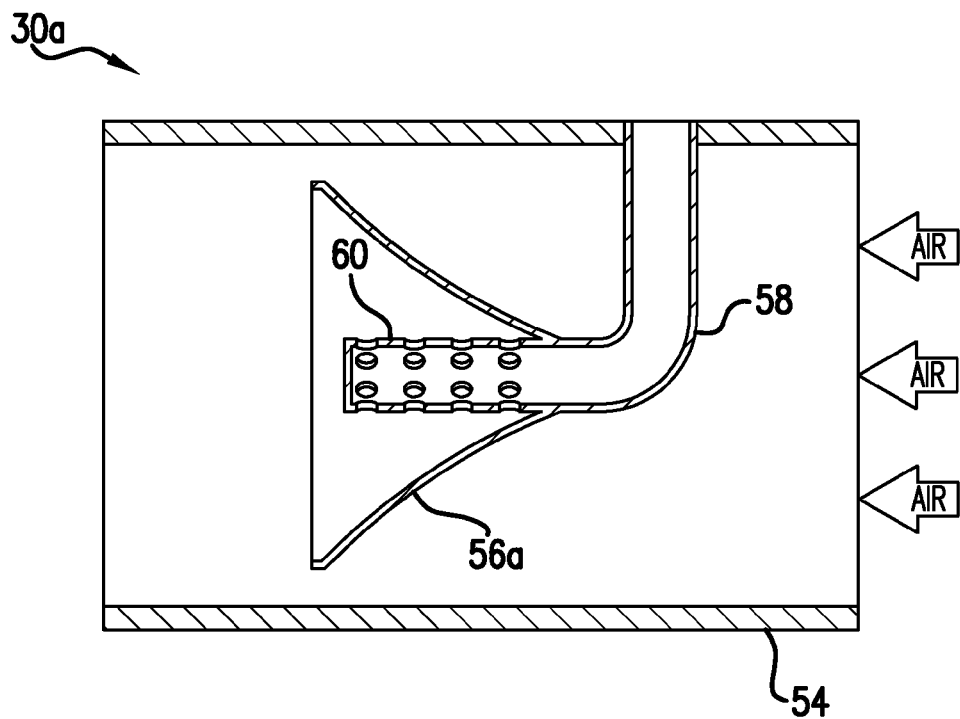
FIG. 3 is a gaseous fuel mixer of the internal combustion engine of FIG. 1 in accordance with a second exemplary embodiment of the present disclosure.
Figure 4:
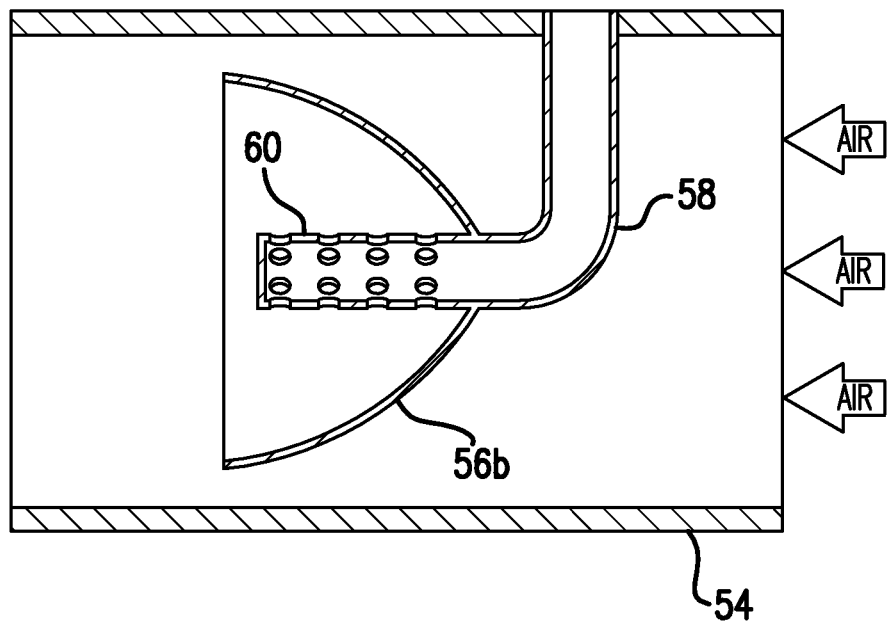
FIG. 4 is a gaseous fuel mixer of the internal combustion engine of FIG. 1 in accordance with a third exemplary embodiment of the present disclosure.

Cone portion 56 may be in the shape of a frustum, which is also described as a frustoconical shape. As shown in FIG. 2, cone portion 56 is a flat or plane frustum. In a second exemplary embodiment of the present disclosure shown in FIG. 3, cone portion 56a of gaseous mixer 30a may be a concave frustum or a concave frustoconical shape. In a third exemplary embodiment of the present disclosure shown in FIG. 4, cone portion 56b of gaseous mixer 30b may be a convex frustum or convex frustoconical shape.

Figure 5:
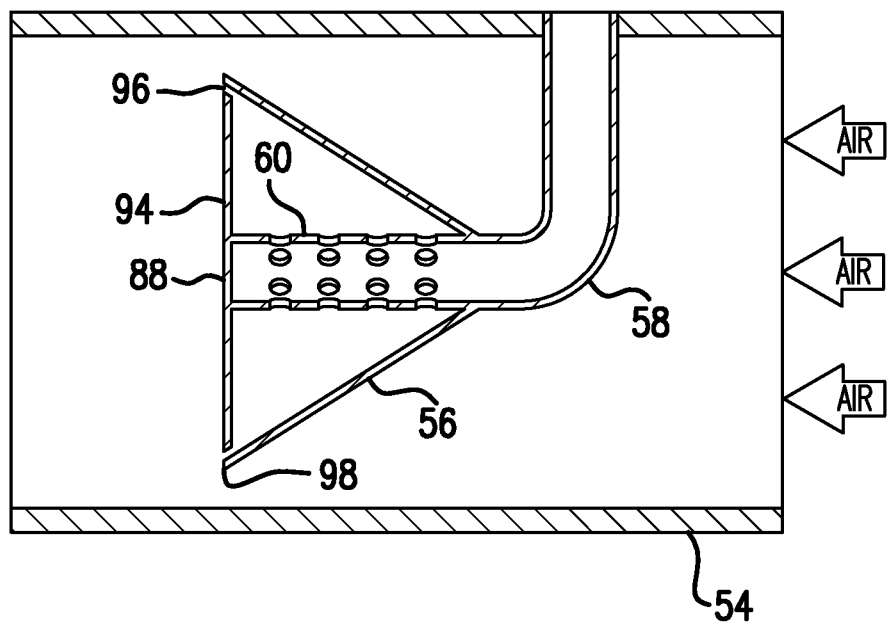
FIG. 5 is a gaseous fuel mixer of the internal combustion engine of FIG. 1 in accordance with a fourth exemplary embodiment of the present disclosure.

A fourth exemplary embodiment of the present disclosure is shown in figure FIG. 5. A gaseous fuel mixer 30c includes an annular gas spread or spreader plate 94 that may be located about closed distal end 88 of outlet element 60, extending transversely or perpendicularly to outer portion axis 66, element axis 74, and/or cone axis 84 away from outlet element 60. Annular gas spreader plate 94 extends to a location near frustoconical cone portion 56, leaving a cone annular gap 96 between annular gas spreader plate 94 and cone portion 56. In an exemplary embodiment, cone annular gap 96 may be in the range 1.0 to 4.5 millimeters. Because much of the mixing between the intake air and the gaseous fuel occurs in the region downstream from an outermost periphery 98 of frustoconical cone portion 56, gas spreader plate 94 improves mixing of the gaseous fuel and intake air by forcing the gaseous fuel through cone annular gap 96 located near outermost periphery 98 of cone portion 56.

Figure 6:
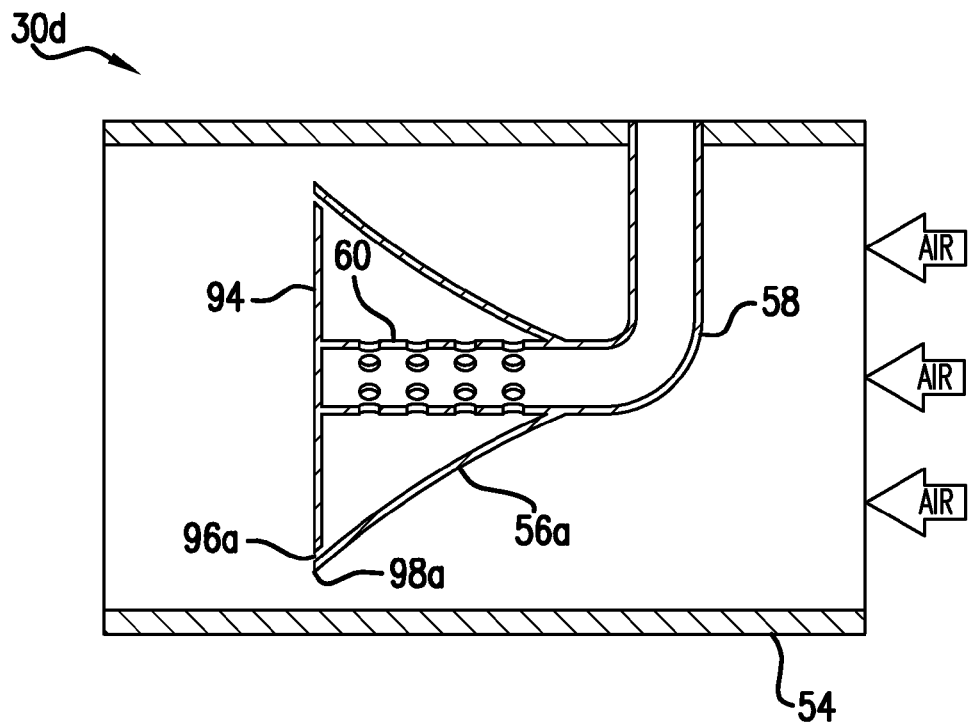
FIG. 6 is a gaseous fuel mixer of the internal combustion engine of FIG. 1 in accordance with a fifth exemplary embodiment of the present disclosure.

A fifth exemplary embodiment of the present disclosure is shown in FIG. 6. A gaseous fuel mixer 30d includes cone portion 56a shown in FIG. 3 and gas spreader plate 94 of FIG. 5. As with gaseous fuel mixer 30c, gas spreader plate 94 forces the gaseous fuel through a cone annular gap 96a near an outermost periphery 98a of cone portion 56a.

Figure 7:
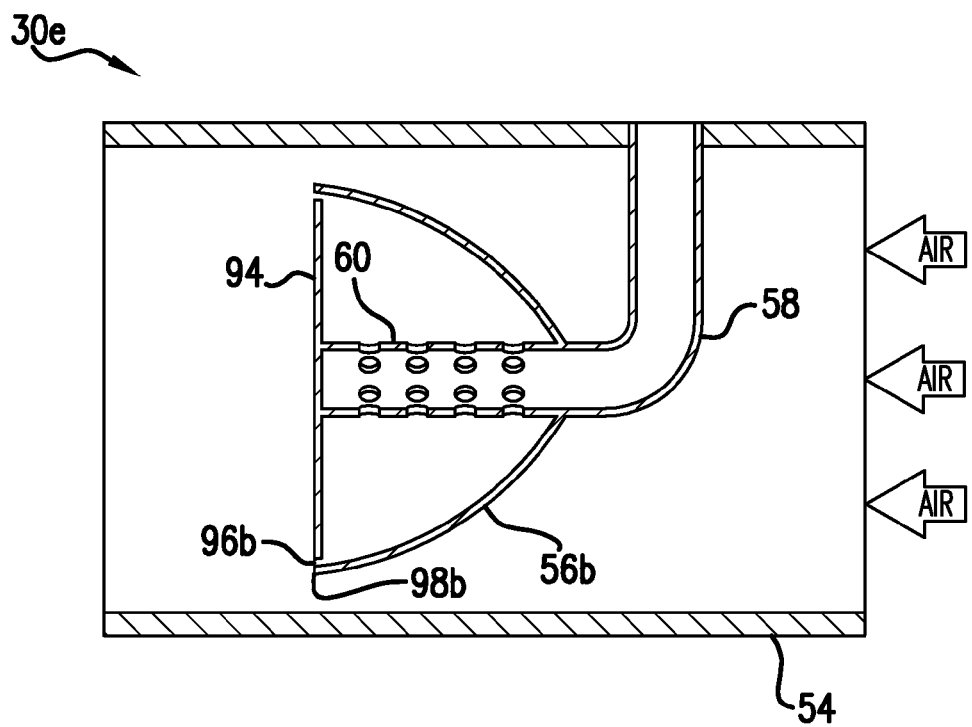
FIG. 7 is a gaseous fuel mixer of the internal combustion engine of FIG. 1 in accordance with a sixth exemplary embodiment of the present disclosure.

A sixth exemplary embodiment of the present disclosure is shown in FIG. 7. A gaseous fuel mixer 30e includes cone portion 56b shown in FIG. 4 and gas spreader plate 94 of FIG. 5. As with gaseous fuel mixers 30c and 30d, gas spreader plate 94 forces the gaseous fuel through a cone annular gap 96b near an outermost periphery 98b of cone portion 56b.

Internal combustion engine 10 functions as follows. External air enters intake circuit 14 by way of inlet portion 24. The air is treated in filtration portion 26 before flowing downstream to compressor 28, where the intake air is pressurized. The intake air may mix with EGR exhaust gas in EGR mixer 32 before flowing downstream through outer portion 54. Connection element 58 is contiguous with cone portion 56 and outlet element 60 at first end 76, and connection element 58 and cone portion 56 are impervious to the flow of air because connection element 58 and cone portion 56 about its periphery are devoid of openings. Because of the configuration of connection element 58 and cone portion 56, intake air is forced to flow longitudinally or axially along and past cone portion 56 through annular outer portion gap 90.

In outer portion 54, gaseous fuel from gaseous fuel system 20 enters gaseous fuel mixer 30 of intake system 14 by way of inlet port 68 formed in outer portion 54, flowing into connection element 58. The gaseous fuel flows along connection element 58 transversely to outer portion axis 66. The gaseous fuel follows fuel passage 70 through bend 72 and then flows longitudinally or axially downstream toward outlet element 60, entering fuel passage 71. The gaseous fuel then flows transversely to element axis 74 through openings 62 into interior portion 80. The gaseous fuel then flows downstream from cone portion 56. The shape of cone portion 56, including the height H and diameter D in the ratios described hereinabove, causes forced recirculation in mixing region 82 behind or downstream from frustoconical cone portion 56 of mixer 30. The forced recirculation helps enhance the entrainment or mixing of gaseous fuel from gaseous fuel system 20 in the intake air flowing through annular outer portion gap 90. The intake air and entrained or mixed gaseous fuel flows downstream into intake manifold 34.

If the gaseous fuel mixer includes a gas spreader plate, such as is shown in FIGS. 5-7, the gaseous fuel flows through annular gap 96 near outermost periphery 98 of frustoconical cone portion 56. The gaseous fuel mixes with intake air flowing through outer portion gap 90 in mixing regions that are concentrated along interior wall 92 of outer portion 54. Without gas spreader plate 94, the mixing of the gaseous fuel and the intake air requires a greater longitudinal distance downstream from cone portion 56 to accomplish.

The primary benefit to gaseous fuel mixer 30 is that it enables optimized mixing of intake air and gaseous fuel in a relatively small volume. As described in detail hereinabove, gaseous fuel mixer 30 includes certain dimensions in specified ratios that yield this optimized mixing, permitting the small package size of gaseous fuel mixer 30. The small size of gaseous fuel mixer 30 permits its use on a variety of internal combustion engines that might otherwise have insufficient space available to be converted to a gaseous fuel engine.

After engine 10 combusts the mixture of intake air and gaseous fuel, high-pressure exhaust gas flows into exhaust manifold 40 of exhaust circuit 16. The exhaust gas flows downstream to turbine 44 of turbocharger 50, rotating turbine 44, which causes rotation of compressor 28. The exhaust gas loses pressure as it flows through turbine 44 and then passes into aftertreatment system 46. Aftertreatment system 46 treats certain emissions in the exhaust gas, for example, aftertreatment system 46 may remove particulates, reduce NOx, and reduce carbon monoxide. The exhaust gas then flows downstream to atmospheric vent 48, which may be an exhaust pipe or stack. Engine 10 may include an EGR system 18. If this system exists, EGR valve 42 may direct a portion of the exhaust gas flow into EGR system 18. Because EGR gas is hot, EGR cooler 52 may reduce the temperature of the EGR gas prior to introduction of the EGR gas into EGR mixer 32.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

I claim:

1. An internal combustion engine, comprising:
an intake circuit including a mixer passage having a mixer passage axis and a gaseous fuel mixer positioned within the mixer passage and extending along the mixer passage axis, the gaseous fuel mixer including a frustoconical cone and an outlet element; the frustoconical cone including a first end, an open second end having a diameter D and positioned downstream from the first end, an interior portion, and a height H, the outlet element being positioned in the interior portion and including a fuel passage and a plurality of transverse openings connecting the fuel passage to the interior portion, the plurality of transverse openings positioned in the interior portion to direct gaseous fuel into the interior portion; and a gaseous fuel system connected to the intake circuit.

2. The internal combustion engine of claim 1, further including a connection portion and an outer portion, wherein the mixer passage is formed within the outer portion, the outer portion includes a port, the gaseous fuel system is connected to the port, and the connection portion connects the port to the outlet element.

3. The internal combustion engine of claim 2, wherein an annular gap is formed between the frustoconical cone second end and the outer portion.

4. The internal combustion engine of claim 1, wherein a ratio of D/H is in the range 1.00 to 1.67.

5. The internal combustion engine of claim 1, wherein a ratio of D/H is in the range 1.29 to 1.39.

6. The internal combustion engine of claim 1, wherein the frustoconical cone has a concave shape.

7. The internal combustion engine of claim 1, wherein the frustoconical cone has a convex shape.

8. The internal combustion engine of claim 1, wherein the outlet portion includes a distal end and the distal end is offset from the frustoconical cone second end toward the frustoconical cone first end.

9. The internal combustion engine of claim 1, wherein the mixer passage has an internal diameter ID and a ratio of ID/D is in the range 1.07 to 1.45.

10. The internal combustion engine of claim 1, wherein the mixer passage has an internal diameter ID and a ratio of ID/D is in the range 1.23 to 1.33.

11. The internal combustion engine of claim 1, the gaseous fuel mixer further including a gas spreader plate extending radially outward from the outlet element toward the frustoconical cone at the frustoconical cone second end.

12. The internal combustion engine of claim 11, wherein a cone annular gap is formed between the gas spreader plate and the frustoconical cone.

13. The internal combustion engine of claim 12, wherein the cone annular gap is in the range 1.0 to 4.5 millimeters.

14. An internal combustion engine, comprising:

an intake circuit including a mixer passage having a mixer passage axis and a gaseous fuel mixer positioned within the mixer passage and extending along the mixer passage axis, the mixer passage having an internal diameter ID, the gaseous fuel mixer including a frustoconical cone and an outlet element, the frustoconical cone including a first end, an open second end having a diameter D and positioned downstream from the first end, an interior portion, a height H, and a cone axis coaxial with the mixer passage, the outlet element being positioned in the interior portion and including a fuel passage and a plurality of transverse openings connecting the fuel passage to the interior portion, the outlet element and the first end of the frustoconical cone attached or formed to prevent air flow from flowing into the interior portion from the mixer passage upstream from the frustoconical cone; and a gaseous fuel system connected to the intake circuit.

15. The internal combustion engine of claim 11, further including a connection portion and an outer portion, wherein the mixer passage is formed within the outer portion, the outer portion includes a port, the gaseous fuel system is connected to the port, and the connection portion connects the port to the outlet element.

16. The internal combustion engine of claim 14, wherein a ratio of ID/D is in the range 1.07 to 1.45.

17. The internal combustion engine of claim 14, wherein a ratio of ID/D is in the range 1.23 to 1.33.

18. The internal combustion engine of claim 14, wherein a ratio of D/H is in the range 1.00 to 1.67.

19. The internal combustion engine of claim 14, wherein a ratio of D/H is in the range 1.29 to 1.39.

20. The internal combustion engine of claim 14, wherein the frustoconical cone has a concave shape.

21. The internal combustion engine of claim 14, wherein the frustoconical cone has a convex shape.

22. The internal combustion engine of claim 14, the gaseous fuel mixer further including a gas spreader plate extending radially outward from the outlet element toward the frustoconical cone at the frustoconical cone second end.

23. The internal combustion engine of claim 22, wherein a cone annular gap is formed between the gas spreader plate and the frustoconical cone.

24. The internal combustion engine of claim 23, wherein the cone annular gap is in the range 1.0 to 4.5 millimeters.

25. The internal combustion engine of claim 1, wherein the outlet element has a closed distal end.

26. The internal combustion engine of claim 1, wherein the plurality of transverse openings of the outlet element are spaced apart along the mixer passage axis.

27. The internal combustion engine of claim 1, wherein each of the plurality of transverse openings of the outlet element is arranged perpendicular to the mixer passage axis.

* * * * *